United States Patent [19]
Andersen

[11] 4,055,823
[45] Oct. 25, 1977

[54] ELECTROMAGNETIC VALVE ASSEMBLY MEANS

[75] Inventor: Erik Andersen, Nordborg, Denmark

[73] Assignee: Danfoss A/S, Nordborg, Denmark

[21] Appl. No.: 686,891

[22] Filed: May 17, 1976

[30] Foreign Application Priority Data

May 22, 1975 Germany ............................ 2522677

[51] Int. Cl.[2] ............................................ F16K 31/06
[52] U.S. Cl. ..................................... 335/255; 335/278
[58] Field of Search .............. 335/251, 255, 260, 262, 335/278

[56] References Cited

U.S. PATENT DOCUMENTS

| | | | |
|---|---|---|---|
| 2,627,544 | 2/1953 | Eck | 335/251 X |
| 3,281,740 | 10/1966 | Riefler | 335/251 X |
| 3,727,160 | 4/1973 | Churchill | 335/255 X |

*Primary Examiner*—A. D. Pellinen

[57] ABSTRACT

An electromagnetic valve assembly of the type having a tube for guiding the plunger armature which tube also supports the surrounding coil unit. A U-shaped yoke surrounds the coil and a housing is provided. The tube, which is attached to a valve casing, has an annular recess at the opposite end for receiving the slotted ring of a ring and nut pair which uses the tube as an abutment for biasing the yoke and the housing towards the valve casing. A lock ring is between the slotted ring and the yoke which has a first lug in a slot of the slotted member and a second lug in a recess in the housing to prevent relative rotation between the slotted ring and the housing.

3 Claims, 3 Drawing Figures

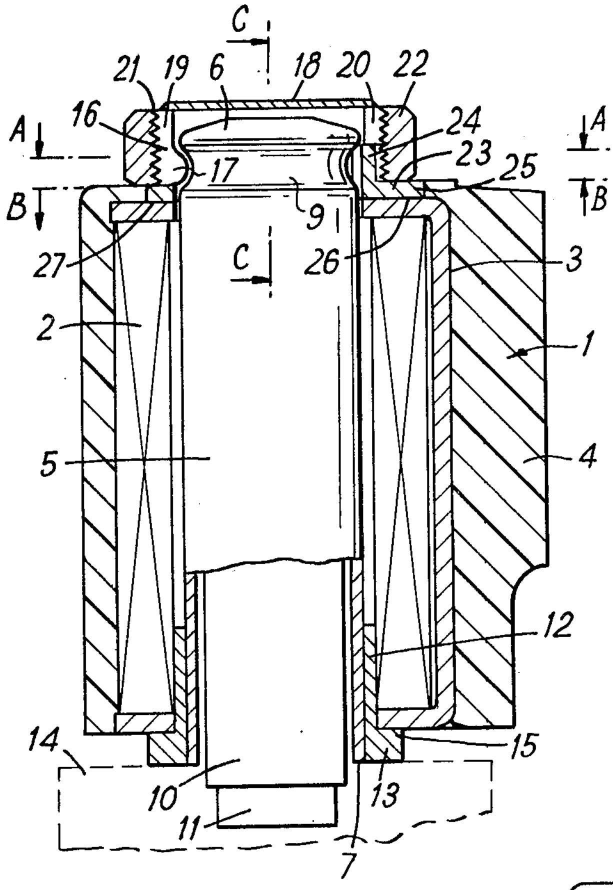
FIG. 1
FIG. 2
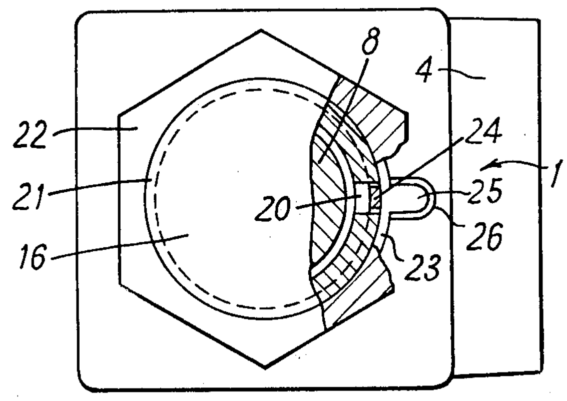
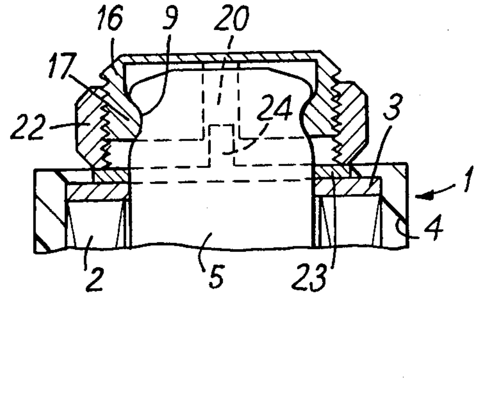
FIG. 3

ELECTROMAGNETIC VALVE ASSEMBLY MEANS

The invention relates to a magnet attachment, particularly for valves, comprising a one-sidedly closed tube which guides a plunger armature and is surrounded by a magnetic coil unit, has an abutment near the open end for supporting the magnetic coil unit and has near the closed end a locking device consisting of a slotted ring which engages in a circumferential annular groove of the tube with an internal bead and a securing element which embraces the ring and prevents its radial expansion.

In a known magnet attachment, the magnetic coil unit comprises a wire coil, a yoke of magnetic material and a housing surrounding everything. The wire coil can be supported on a coil carrier. The tube consists of non-magnetic material, contains a magnetic plug towards the closed end and a plunger armature towards the open end, the armature being attractable towards the magnetic plug against the force of a spring. The free end of the tube comprises an exterior flange and, beyond this, a screw-threaded ring with an external screwthread that can be screwed into a complementary tapped hole of the housing of the apparatus to be actuated, e.g. the valve. The end face of the screw-threaded ring confronting the outer flange or, if the ring is fixed to the housing of the magnetic coil unit, the outer flange itself serves as an abutment for supporting the magnetic coil unit. On the opposite side of the magnetic coil unit, the closed end of the tube which is provided with a peripheral groove projects outwardly. Onto this there is pushed an axially slotted plastics ring having an internal bead for engaging in the annular groove and an external bead. As a securing element there is a cap having an internal diameter corresponding to the external diameter of the ring when engaged in the annular groove. The exterior bead engages in a groove of the cap to prevent the cap from falling off.

In this way one achieves that the magnetic coil unit and the tube are joined in a simple manner and can also be separated again and that the magnetic coil is nevertheless securely seated on the tube during operation without becoming lost. There is, however, the danger that vibration noises will occur or that the magnetic coil unit will turn on the tube. This is because in mass production the tolerances are so great that it is not possible to ensure that for all attachments of a series the magnetic coil unit will have no play between the abutment and the locking device.

The invention therefore has as an object to provide a magnet attachment of the aforementioned kind, in which the magnetic coil unit is secure against vibration noises and against twisting even with large tolerances.

This object is achieved according to the invention in that the slotted ring has external screwthreading and the securing element is a nut which can be tightened until it abuts the magnetic coil unit or a part supported thereby.

With this construction, the nut only serves to prevent the radial expansion of the slotted ring but also as tolerance copensating means and as a clamping element. Tightening of the nut can take into account very considerable tolerance differences. By tightening the nut with a predetermined torque, one ensures that the magnetic coil unit is pressed with a predetermined clamping force against the abutment on the opposite side. Vibrating or turning of the magnetic coil unit is therefore no longer possible. The clamping forces also serve to ensure that the nut cannot become loose during operation.

Further, it is favourable if the slotted ring and/or the nut consist of elastic plastics material. On tightening the nut, elastic deformations occur to provide an additional safeguard against loosening of the nut.

It is of particular advantage if the slotted ring has at least two slots extending from the end facing the magnetic coil unit, the ring portions thus formed being, however, interconnected at the free other end. Consequently, the slotted ring has a constant diameter at that side from which the nut is screwed on. This facilitates screwing on of the nut. Nevertheless, even with two slots the ring can be expanded without effort in such a way that it can be pushed over the closed end of the tube until it engages in the annular groove.

This can, for example, be achieved in that the slots terminate in front of the other end.

It is also possible to close the slotted ring at the free end by a throughgoing base. This base serves, on the one hand, to interconnect the ring portions. However, it may also have the task of sealing the region of the closed end of the tube from the outside.

In a preferred embodiment, there is an anti-rotation ring which surrounds the tube at the end of the magnetic coil unit facing the locking device and engages with a first lug in a slot of the slotted ring and with a second lug in a recess at this end of the magnetic coil unit. By means of this anti-rotation ring, the magnetic coil unit and the slotted ring are given an accurately predetermined position in relation to one another. This has two advantages. On the one hand, when the nut is tightened the slotted ring is prevented from turning by reason only of the retention of the magnetic coil unit. On the other hand, after tightening of the nut the magnetic coil unit is not only secured against rotation by reason of the clamping forces of the nut but also with the aid of the slotted ring clamped to the tube.

The anti-rotation ring may be disposed in an annular depression in the end face of the magnetic coil unit and a radial recess for receiving the second lug may extend from the depression. The annular depression may form a step directly adjoining the tube-receiving hole of the magnetic coil unit. If the magnetic coil unit has a plastics housing, the annular depression may be formed in the plastics material.

The invention will now be described in more detail with reference to the example shown in the drawing. In the drawing:

FIG. 1 is a longitudinal section through a magnet attachment according to the invention;

FIG. 2 is a plan view of the FIG. 1 embodiment, parts having been broken away at the level A and the level B, and FIG. 3 is a longitudinal section on the line C—C in FIG. 1 with a magnetic coil unit of shallower height.

FIG. 1 shows a magnetic coil unit 1 having a mangetic coil 2, magnetic yoke 3 in the form of a U-shaped magnetic sheet, and a plastics housing 4 surrounding everything. The coil 2 is penetrated by a tube 5 of non-magnetic material having a closed end 6 and an open end 7. In the vicinity of the closed end 6 there is a magnetic plug 8. At this location there is also an annular groove 9 having a channel-shaped cross-section. In the region of the free end there is a plunger armature 10 which, at its free end, carries for example the closure member 11 of a valve and is loaded by a spring disposed between the magnetic plug 8 and plunger armature 10. Secured such as by soldering to the outside of the tube 5 near the open end 6 there is a retaining ring 12 having a flange 13. The underside of the flange 13 serves to secure the tube 5 to a valve housing 14 indicated in broken lines. The top of the flange forms an abutment 15 for the magnetic coil unit 1.

In the vicinity of the closed tube end 6 there is provided a securing device. The latter comprises a slotted ring 16 having an interior bead 17 engaging in the annular groove 9 of the tube 5 and being of cap shape by reason of a base 18. The ring 16 has two slots 19 and 20 each of which extends from the side facing the magnetic coil unit 1 but terminates in front of the other end. In addition, the periphery of this slotted ring 16 is provided with a screwthread 21. The securing device further comprises a hexagonal nut 22, which is screwed onto the external screwthreading 21, prevents radial expansion of the slotted ring 16 and therefore keeps the internal bead 17 in engagement with the annular groove 9. This nut 22 is tightened to such an extent that it presses the magnetic coil unit 1 against the abutment 15 with a predetermined force.

There is also provided an anti-rotation ring 23 having a first lug 24 engaging in a slot 20 of the slotted ring 16 and a second lug 25 engaging in a radial recess 26 at the magnetic coil unit 1. The anti-rotation ring 23 surrounds the tube 5 and is disposed in an annular depression 27 at the end of the plastics housing 4 of the magnetic coil unit 1. The recess 26 is a radial extension of this. As a rule, this anti-rotation ring 23 is of metal and can also form the clamping face engaged by the nut 22.

Manufacture can take place in the following manner. The tube 5, which has already provided with the mangetic plug 8 and plunger armature 10, is secured to the valve housing 14 with the aid of the retaining ring 12. The magnetic unit 1 is subsequently pushed thereover. The slotted ring 16 is pushed over the closed tube end 6 and expands until the internal bead 17 engages in the annular groove 9. The nut 22 is then screwed thereover, the free end of the slotted ring 16 of the nut 22 offering an accurately fitting screwthread diameter. The nut 22 is tightened until its underside lies against the magnetic coil unit 1 or the anti-rotation ring 23. If the magnetic coil unit 1 is comparatively high, the nut 22 is screwed on the slotted ring 16 only by a predetermined minimum amount (FIG. 1). With a magnectic coil unit 1 of shallower height, however, the nut 22 can be turned through a considerably further distance (FIG. 3) so as to compensate all tolerances in this way. Finally, the nut 22 is tightened by a torque spanner. This produces a clamping force which acts downwardly on the magnetic coil unit 1 and upwardly through the internal bead 17 and the annular groove 9 onto the tube 5. Accordingly, these two parts are so clamped that any vibratory movement or rotation is prevented. Prior to tightening the nut 22, the magnetic coil unit 1 is placed in the desired angular position on the valve housing 14 and then secured. By reason of the anti-rotation ring 23, the slotted ring 16 is then also secured against rotation. After tightening of the nut 22, the magnetic coil unit 1 is then securely held on the valve housing 14 in the desired angular position.

I claim:

1. An electromagnetic valve assembly comprising, a valve casing, a tube member attached to said casing at one end thereof and having an annularly shaped recess at the other end thereof, a coil surrounding said tube member, a U-shaped yoke partially surrounding said coil having an upper leg spaced from said recess, a housing surrounding said coil and said yoke, an externally threaded axially slotted ring having an internal bead receivable in said recess, a nut threaded on said ring biasing said housing towards said valve casing, and ring having a pair of axially extending slots on opposite sides thereof.

2. An electromagnetic valve assembly comprising, a valve casing, a tube member attached to said casing at one end thereof and having an annularly shaped recess at the other end thereof, a coil surrounding said tube member, a U-shaped yoke partially surrounding said coil having an upper leg spaced from said recess, a housing surrounding said coil and said yoke, and externally threaded axially slotted ring having an internal bead receivable in said recess, a nut threaded on said ring biasing said housing towards said valve casing, said housing having flange means engaging said upper yoke leg and forming a circular hole having a radially extending recess, an annuarly shaped lock ring in said hole in engagement with said upper leg yoke, and lug means on said lock ring engaging said slotted ring and said housing to prevent relative rotation therebetween.

3. An electromagnetic valve assembly according to claim 2 wherein said slotted ring has axially extending slots on opposite sides thereof, said lug means including a first lug in one of said slots and a second lug in said recess of said housing flange means.

* * * * *